US012785114B2

(12) United States Patent
Yang et al.

(10) Patent No.: US 12,785,114 B2
(45) Date of Patent: Nov. 3, 2026

(54) HIGHLY CRYSTALLIN, POROUS, HYDROPHILIC CATALYST FOR FUEL CELL, MANUFACTURING METHOD THEREOF, AND FUEL CELL USING SAME

(71) Applicant: KORENS RTX Co., Ltd., Gyeryong-si (KR)

(72) Inventors: Dae Soo Yang, Daejeon (KR); Hyean Yeol Park, Daejeon (KR); Tong Hyun Kang, Daejeon (KR)

(73) Assignee: KORENS RTX Co., Ltd., Gyeryong-si (KR)

( * ) Notice: Subject to any disclaimer, the term of this patent is extended or adjusted under 35 U.S.C. 154(b) by 633 days.

(21) Appl. No.: 18/323,084

(22) Filed: May 24, 2023

(65) Prior Publication Data

US 2023/0387424 A1 Nov. 30, 2023

(30) Foreign Application Priority Data

May 30, 2022 (KR) ........................ 10-2022-0066147
Aug. 10, 2022 (KR) ........................ 10-2022-0100175

(51) Int. Cl.
*H01M 4/92* (2006.01)

(52) U.S. Cl.
CPC .................................. *H01M 4/926* (2013.01)

(58) Field of Classification Search
None
See application file for complete search history.

(56) References Cited

U.S. PATENT DOCUMENTS 5,916,702 A * 6/1999 Marucchi-Soos ..... H01M 4/921 252/502
2007/0116625 A1* 5/2007 Joo .......................... B01J 21/18 429/492

FOREIGN PATENT DOCUMENTS

| | | | | | |
|---|---|---|---|---|---|
| CN | 1330423 | A | * | 1/2002 | |
| CN | 102742056 | A | * | 10/2012 | H01M 8/1067 |
| JP | 2019-172496 | A | | 10/2019 | |
| KR | 10-2006-0134414 | A | | 12/2006 | |
| KR | 10-2017-0052889 | A | | 5/2017 | |
| KR | 101901223 | B1 | * | 9/2018 | B01J 37/341 |
| KR | 10-2019-0071334 | A | | 6/2019 | |

OTHER PUBLICATIONS

Machine translation of Seok et al., KR 20190071334A (Year: 2019).*
Machine translation of Pak et al., KR 101901223B1 (Year: 2018).*
Machine translation of Qiu et al., CN 1330423A (Qiu) (Year: 2002).*

(Continued)

*Primary Examiner* — Keling Zhang
(74) *Attorney, Agent, or Firm* — Sughrue Mion, PLLC

(57) ABSTRACT

Provided are a high-crystallinity, porous, and hydrophilic catalyst for a fuel cell, a manufacturing method thereof, and a fuel cell using the same. The method of manufacturing a fuel cell provides a new carbon support composition having the following features: supporting of metal compounds by electron beam reduction of metal precursors, improvement of mesoporosity and dispersion of crystalline carbon obtained by metal vaporization by sequential low-temperature heat treatment, and improved performance stability in a low-humidity atmosphere.

16 Claims, 15 Drawing Sheets

(56) References Cited

OTHER PUBLICATIONS

Ivanova et al., M0.5Zn0.5Fe2O4 (M=Cu, Co, Mn, Ni) ferrites supported on activated carbon as catalysts for methanol decomposition, Bulgarian Chemical Communications, 2021 (Year: 2021).*

Machine translation of Mitsuta et al., CN 102742056A (Year: 2012).*

* cited by examiner

HIGHLY CRYSTALLIN, POROUS, HYDROPHILIC CATALYST FOR FUEL CELL, MANUFACTURING METHOD THEREOF, AND FUEL CELL USING SAME

CROSS-REFERENCE TO RELATED APPLICATION

This application claims the benefit of Korean Patent Applications No. 10-2022-0066147, filed on May 30, 2022 and No. 10-2022-0100175, filed on Aug. 10, 2022 in the Korean Intellectual Property Office, the disclosure of which is incorporated herein in its entirety by reference.

BACKGROUND

1. Field

The present disclosure relates to a highly crystalline, porous, hydrophilic catalyst, and more particularly, to a highly crystalline fuel cell catalyst having controlled porosity and hydrophilic/hydrophobic properties, a method of manufacturing the same, and a fuel cell using the same.

2. Description of the Related Art

Hydrogen, which is receiving attention as the next-generation eco-friendly energy source, is being recognized as a driving force for the transition to a hydrogen economy society. Polymer electrolyte membrane fuel cells (PEMFCs), one of these power sources, convert, using the electricity generated by the combination process of hydrogen and oxygen, chemical energy that can be used for transportation and building power generation into electrical energy.

The operation principle of fuel cells involves supplying fuel (hydrogen, methanol, etc.) to the anode, where the fuel is oxidized by a catalyst and electrons are released, which are conducted to the cathode through an external load, and at the cathode, the oxidizer is reduced by catalysis, producing water and generating electricity (non-patent literature, Yun Wang et al., Applied Energy 88 (2011) 981-1007).

The energy conversion efficiency of hydrogen fuel cells is superior to that of internal combustion engines, ranging from 50% to 80%. This characteristic, which exceeds the efficiency of internal combustion engines, which is close to 20% to 50%. Accordingly, there is a need for a design for portability and a design that is suitable for various purposes.

Carbon supports efficiently transfer electrons generated during the catalyst reaction in fuel cells and facilitate mass transfer, contributing to the performance of the fuel cell.

Carbon supports are supports for effectively and uniformly supporting platinum catalytic active sites. In general, porous, conductive, and hydrophilic carbon structures are used therefor. Specifically, carbon nanostructures in which micropores and mesopores constitute the main pore size, are used.

The porosity of carbon supports, a contributing factor to the performance of fuel cells, is controlled by various surface activation technologies.

In the case of graphitization, which determines the electrical conductivity of carbon supports, the degree of crystallization is controlled by heat treatment of an existing commercial carbon support at a temperature of 1800° C. or higher in an inert ($N_2$, Ar) gas atmosphere in a high-temperature heat treatment reactor, which is a high-temperature graphitization process.

Through the control of the degree of hydrophobicity/hydrophilicity of the carbon support, which is a contributing factor to fuel cell performance, and the creation of a smooth humidification atmosphere for catalysts, carbon oxidation reactions are suppressed, thereby enhancing corrosion resistance and durability. In the case of controlling the hydrophilic property, hydrophilicity can be enhanced by treating carbon supports with acidic solutions such as nitric acid and sulfuric acid to form functional groups on the surface of carbon supports.

However, during the additional treatment process, risk factors caused by the use of a high-concentration acidic solution may occur, and additional processes are required.

Furthermore, in the case of carbon supports that have agglomerated particles, it is difficult to control porosity through the control treatment technology, which makes it difficult to efficiently support platinum catalyst active sites, and the low catalyst dispersion leads to the efficiency of the fuel cell stack.

SUMMARY

Provided is a method of preparing a fuel cell catalyst with improved hydrophilicity/hydrophobicity by optimizing the control of mesoporosity and minimizing agglomeration of carbon support particles.

Additional aspects will be set forth in part in the description which follows and, in part, will be apparent from the description, or may be learned by practice of the presented embodiments.

According to an aspect of an embodiment, a method of preparing a fuel cell catalyst includes heat-treating a carbon support, forming a first precursor mixed solution by mixing the carbon support and a first metal precursor solution, supporting a first metal by irradiating the first precursor mixed solution with an electron beam, heat-treating the carbon support supporting the first metal, forming a second precursor mixed solution by mixing the carbon support and a second metal precursor solution, alloying a second metal by irradiating the second precursor mixed solution with an electron beam, and obtaining a carbon support in which the second metal is alloyed.

In an embodiment, in the heat-treating of the carbon support, a heat treatment temperature may be in the range of 400° C. to 700° C. and a heat treatment time may be in the range of 1 hour to 3 hours.

In an embodiment, the purity of the carbon support is improved by the heat-treating of the carbon support.

In an embodiment, the first metal precursor may be a precursor of zinc (Zn), magnesium (Mg), or calcium (Ca).

In an embodiment, the first metal precursor may be $Zn(NO_3)_2 \cdot 6H_2O$, $Zn_3(PO_4)_2 \cdot 4H_2O$, or $ZnSO_4 \cdot 7H_2O$.

In an embodiment, in the forming of the first precursor mixed solution, the pH of the first precursor mixed solution is adjusted to be basic.

In an embodiment, in the supporting of the first metal, the electron beam is irradiated for not more than 20 minutes.

In an embodiment, in the supporting of the first metal, the first precursor mixed solution that has been irradiated with the electron beam is filtered and then dried.

In an embodiment, in the heat-treating of the carbon support supporting the first metal, the heat treatment temperature is in the range of 1000° C. to 1600° C.

In an embodiment, in the heat-treating of the carbon support supporting the first metal, the heat treatment time is 1 hour to 5 hours.

In another aspect, the second metal precursor may be a platinum (Pt) precursor.

In an embodiment, in the forming of the second precursor mixed solution, the pH of the second precursor mixed solution is adjusted to be basic.

In an embodiment, in the alloying the second metal by irradiating the second precursor mixed solution with an electron beam, the irradiation time of the electron beam is in the range of 15 minutes to 30 minutes.

In an embodiment, in the obtaining of a carbon support in which the second metal is alloyed, the second precursor mixed solution that has been irradiated with an electron beam, is filtered and then dried.

In an embodiment, the fuel cell catalyst includes mesopores having the size of 2 nm to 50 nm.

In an embodiment, the contact angle of the fuel cell catalyst is in the range of 10° to 19°.

According to an aspect of another embodiment, provided is a fuel cell catalyst prepared by using the method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Embodiment of present disclosure may be modified in various forms, and the scope of present disclosure is not limited to the embodiments described below. In addition, the embodiments of the present disclosure are provided to more completely explain the present disclosure to those with average knowledge in the art.

Furthermore, the wording "include" or "comprise" certain component throughout the specification refer to the case where other components may be further included without excluding other components unless otherwise stated.

Figure 1:
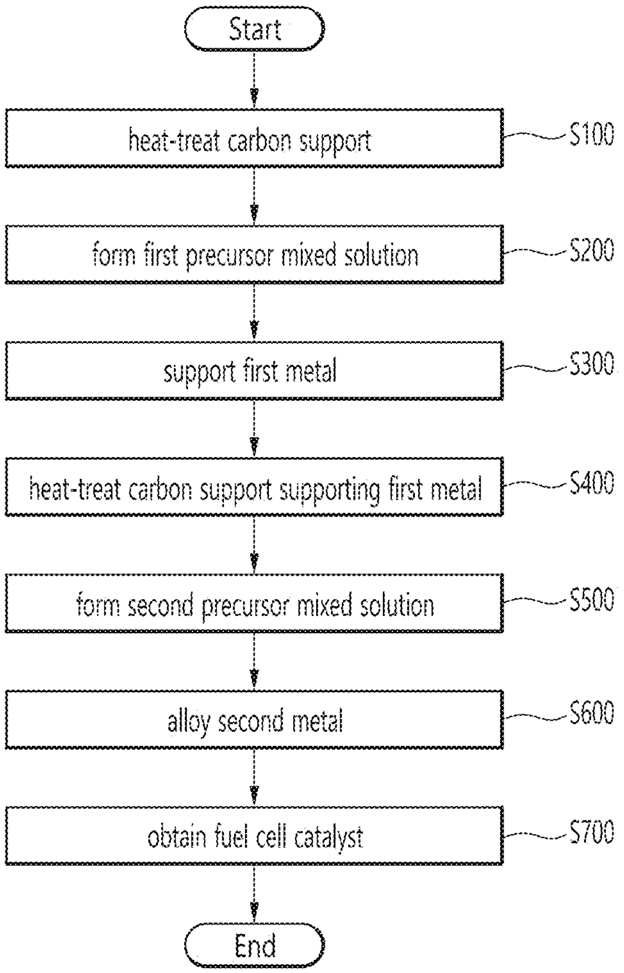
FIG. 1 is a flowchart sequentially illustrating a method of preparing a fuel cell catalyst according to an embodiment of the present disclosure.
Figure 2A:
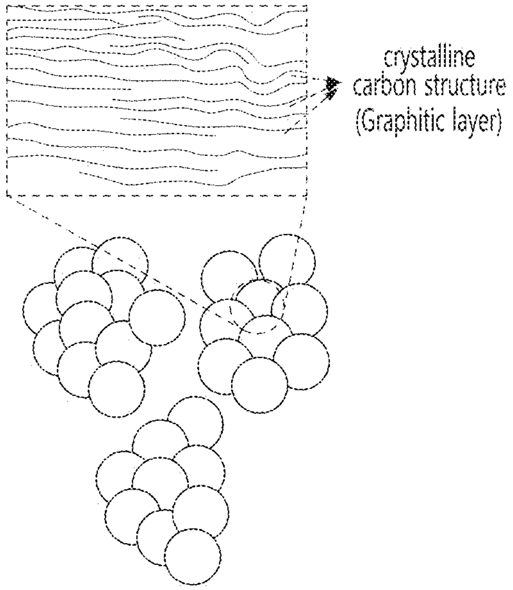
FIGS. 2A, 2B and 2C illustrate a diagram for explaining a method of preparing a fuel cell catalyst according to an embodiment of the present disclosure.
Figure 2B:
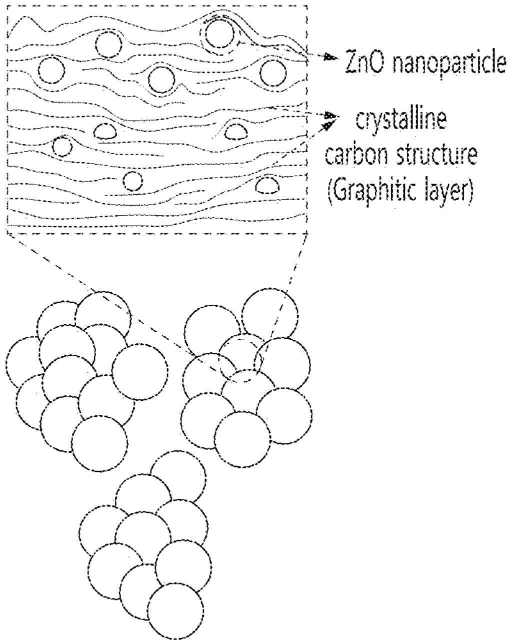
Figure 2C:
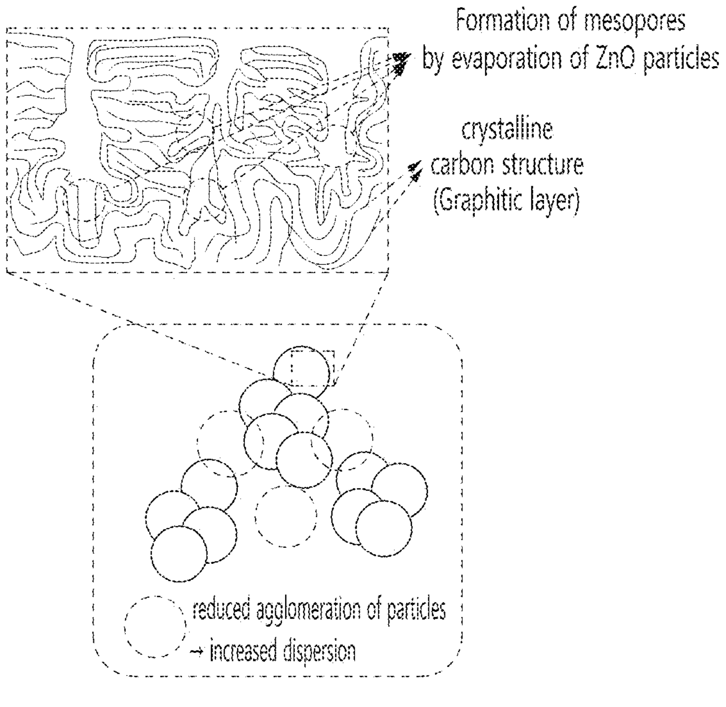

FIG. 1 is a flowchart sequentially illustrating a method of preparing a fuel cell catalyst according to an embodiment of the present disclosure, and FIGS. 2A to 2C are diagrams for describing the method of manufacturing the fuel cell catalyst of FIG. 1.

Referring to FIGS. 1 and 2A to 2C, a method of manufacturing a fuel cell catalyst according to the present disclosure includes heat treating a carbon support (S100), forming a first precursor mixed solution (S200), supporting a first metal (S300), heat treating the carbon support supporting the first metal (S400), forming a second precursor mixed solution (S500), alloying the second metal (S600), and obtaining a fuel cell catalyst which is alloyed with the second metal (S700).

In an embodiment of the present disclosure, the heat treating of the carbon support (S100) is a step of heat treating the amorphous carbon support in an air atmosphere before manufacturing the high crystalline carbon support. The heat treatment temperature may be 400° C. to 700° C., and the heat treatment time may be 1 hour to 3 hours. According to an embodiment of the present disclosure, the heat treatment time may be 2 hours. According to the method for manufacturing a fuel cell catalyst according to an embodiment of the present disclosure, the purity of the carbon support may be improved by removing impurities such as ash by the heat treatment process. FIG. 2A shows the carbon support (starting material).

The forming a first precursor mixed solution (S200) is a step of forming a first precursor mixed solution by mixing the heat-treated carbon support and the first metal precursor solution.

In this regard, the first metal precursor may be a precursor of zinc (Zn), magnesium (Mg), or calcium (Ca), for example, zinc nitrate hydrate ($Zn(NO_3)_2 \cdot 6H_2O$), zinc phosphate hydrate ($Zn_3(PO_4)_2 \cdot 4H_2O$), or zinc sulfate hydrate ($ZnSO_4 \cdot 7H_2O$). According to an embodiment of the present disclosure, the first metal precursor may be zinc nitrate hydrate.

The forming of the first precursor mixed solution (S200) may include preparing a first metal precursor solution, followed by mixing with a carbon support, thereby forming a first precursor mixed solution.

The solvent in the first metal precursor solution may be a mixed solvent of water and alcohol. The alcohol contained in the solvent may be a polyhydric alcohol, and at least one selected from the group consisting of acetone, ethanol, isopropyl alcohol, ethanol, n-propyl alcohol, butanol, ethylene glycol, diethylene glycol, and glycerol.

The first metal precursor solution may be prepared by using a commonly used dispersion process, and for example, an ultrasonic dispersion process. This dispersing process may be performed under conditions including the operation time of 10 minutes and the amplitude intensity of not more than 50%. A stirring time of less than 500 RPM is provided and a mixing process is included. While stirring the solution, a uniform temperature may be maintained throughout the solution by using the temperature controller. In this regard, the temperature may be maintained in the range of 10° C. to 30° C., 10° C. to 25° C., 10° C. to 20° C., or 10° C. to 15° C. In an embodiment, the temperature may be maintained at 15° C.

Meanwhile, the first precursor mixed solution is prepared by mixing a carbon support with a first metal precursor solution, and may be prepared using a commonly used method, for example, through a pulse ultrasonic dispersion process and a stirring process. This process may be performed under conditions including the operation time of 30 minutes and an amplitude intensity of not more than 50%, and may include adjusting the pH of the first precursor mixed solution to be basic.

In this regard, any method may be used herein as long as the method can adjust the pH. For example, the pH may be adjusted by quantitatively injecting a pH adjusting agent. At least one of conventional pH adjusting agents such as NaOH, KOH, and aqueous ammonia may be used, but is not limited thereto, and the pH range may be a pH of 8 to 14. For example, the pH may be adjusted to be in the range of 8 to 10 by using 1 M NaOH.

The supporting the first metal (S300) is a step of irradiating the first precursor mixed solution with an electron beam. FIG. 2B shows a carbon support which supports the first metal. According to an embodiment of the present disclosure, it can be confirmed that zinc oxide is supported on the carbon support.

The electron beam may have energy of 0.1 MeV to 2 MeV, and an applied current may be 0.1 mA to 20 mA. When an electron beam is irradiated under these conditions, ions of the first metal are reduced and the first metal is supported on the carbon support.

The time to irradiate the electron beam may be not more than 20 minutes, not more than 15 minutes, not more than 10 minutes, not more than 5 minutes, or not more than 3 minutes.

In the irradiating of the electron beam, the electron beam may be irradiated for an appropriate time according to the type of the first metal.

Meanwhile, the supporting the first metal (S300) may include drying after filtering the first precursor mixed solution irradiated with the electron beam. The filtering method is not particularly limited, and may be filtered using a vacuum filter. The method of drying is not particularly limited, and drying may be performed in an oven. In the case of drying in an oven according to an embodiment, the supporting the first metal precursor may be dried at a temperature of not more than 100° C., for example, the temperature of 60° C.

The heat-treating of the carbon support supporting the first metal (S400) may be performed in a heat treatment furnace in an inert gas (nitrogen ($N_2$) or argon (Ar)) atmosphere. The heat-treated carbon support is shown in FIG. 2C. It is confirmed that, as the heat treatment is performed, the supported first metal particles are evaporated and mesopores are formed.

The heat treatment temperature may be from 1000° C. to 1600° C., 1000° C. to 1500° C., 1000° C. to 1400° C., 1000° C. to 1300° C., 1100° C. to 1600° C., 1100° C. to 1500° C., or 1100° C. to 1400° C. According to an embodiment of the present disclosure, the heat treatment temperature may be 1100° C. to 1300° C. The heat treatment time may be from 1 hour to 5 hours, 1 hour to 4 hours, or 2 hours to 4 hours. In an embodiment, the heat treatment time may be 3 hours. The heat treatment time may be adjusted according to the type of the first metal precursor.

Through the heat treatment, a carbothermal reduction of the first metal may be performed. At this time, the anchored first metal vaporizes and thus, the aggregation rate of the crystalline carbon support, which had been aggregated, is decreased, and mesopores are formed on the surface of the highly crystalline carbon, thereby controlling porosity.

The control of porosity refers to control of meso/microporosity through changes in the surface area and volume, which may be made depending on one or more selected from the type of first metal, the heat treatment temperature, the heat treatment time, and the content ratio of carbon and first metal precursor.

The degree of crystallization of the carbon support may be confirmed through X-ray diffraction (XRD) and Raman spectroscopy analysis, and the comparison of porosity may be performed by specific surface area analysis using nitrogen ($N_2$) gas adsorption.

In addition, according to the manufacturing method of the fuel cell catalyst according to an embodiment of the present disclosure, the hydrophilic group of the carbon support is ensured through a relatively low temperature heat treatment of 1000° C. to 1600° C. to address the dispersion and aggregation issue which may occur during the preparation of membrane electrode assembly (MEA) slurry. As such, the formation of uniform electrode may be induced, which leads to the increase in the performance and durability of a fuel cell.

The increase in the hydrophilicity of the carbon support results from the exposure of the amorphous carbon layer which may occur during the exfoliation process of the carbon layer due to the formation of pores after heat treatment. However, when the exposed amorphous carbon layer reaches a critical value, the additional exposure of the exfoliated crystalline carbon layer may result in the increase in hydrophobicity.

In the present specification, the crystalline carbon support was heat treated at a temperature of 1000° C. to 1400° C. for 5 hours in an oxygen atmosphere heat treatment furnace, and this case was set as a comparative example.

The forming the second precursor mixed solution (S500) is a step of mixing the heat-treated carbon support with the second metal precursor solution, and includes preparing a carbon support dispersion solution and then mixing the same with the second metal precursor solution.

The carbon support dispersion solution may be prepared by quantitatively injecting distilled water, alcohol, and highly crystalline carbon support in a total amount of 20 L at a rate of 5 L/min to 20 L/min using an automated solution manufacturing system. In an embodiment, the quantitatively injection rate may be 10 L/min. The subsequent dispersion process may be performed using a commonly used method, and is the same as described above in the description made in connection with the first metal precursor solution in the forming of the first precursor mixed solution (S200).

In this case, the solvent of the carbon support dispersion solution is the same as described above in connection with the solvent of the first metal precursor solution, and the volume ratio of water and alcohol in the solvent may be 1:0.1 to 1:2. As an example, the solvent may include water and alcohol in a volume ratio of 1:0.5 to 1:1.

Meanwhile, the second metal precursor may be a platinum precursor. The platinum precursor may include at least one selected from $H_2PtCl_6$, $H_6Cl_2N_2Pt$, $PtCl_2$, $PtBr_2$, acetylacetonate, $K_2(PtCl_4)$, $H_2Pt(OH)_6$, $Pt(N_{03})_2$, $[Pt(NH_3)_4]C_{12}$, [Pt(At least one selected from the group consisting of $NH_3)_4](HCO_3)_2$, $[Pt(NH_3)_4](OAc)_2$, $(NH_4)_2PtBr_6$, $(NH_3)$ $_2PtCl_6$, and hydrates thereof, and is not limited thereto.

The second metal precursor mixed solution may be formed by injecting the second metal precursor aqueous solution into the carbon support dispersion solution, and may be injected at a rate of 5 L/min to 20 L/min. In an embodiment, the injection rate may be 10 L/min.

The forming of the second metal precursor mixed solution (S500) may include adjusting the pH of the precursor mixed solution to be basic. In this regard, any method may be used herein as long as the method can adjust the pH. For example, the pH may be adjusted by quantitatively injecting a pH adjusting agent. At least one of conventional pH adjusting agents such as NaOH, NaOH, $Na_2CO_3$, KOH, $K_2CO_3$, and $H_2SO_4$ may be used, but is not limited thereto, and the pH range may be a pH of 8 to 14. For example, the pH may be adjusted to be in the range of 10 to 11 by using 1 M NaOH.

The alloying of the second metal (S600) is a step of alloying the second metal by irradiating the second metal precursor mixed solution with an electron beam.

The electron beam may have energy of 0.1 MeV to 2 MeV, and an applied current may be 0.1 mA to 20 mA. When an electron beam is irradiated under these conditions, ions of the second metal are reduced and the second metal is alloyed to the carbon support.

The irradiation time of the electron beam may be 5 minutes to 40 minutes, 5 minutes to 30 minutes, 10 minutes to 30 minutes, 15 minutes to 30 minutes, 10 minutes to 20 minutes, or 15 minutes to 20 minutes. In an embodiment, the irradiation time may be 15 minutes to 20 minutes. The electron beam may be irradiated for an appropriate time according to the type of the second metal.

The obtaining the fuel cell catalyst alloyed with the second metal (S700) may include filtering and drying the electron beam-irradiated precursor mixed solution. Methods of filtration and drying are not particularly limited, and are as described above in the step of supporting the first metal (S300).

The fuel cell catalyst is characterized in that mesopores are developed, and the contact angle may be 10° to 19°, 12° to 19°, 14° to 19°, 10° to 17°10° to 16°, 12° to 16°, or 14° to 16°.

The term "mesopore" used herein refers to pores with a diameter of 2 nm to 50 nm.

Another aspect of the present disclosure provides a fuel cell catalyst prepared by the manufacturing method.

The fuel cell may be a polymer electrolyte fuel cell, and the membrane electrode assembly of the polymer electrolyte fuel cell includes an anode, a cathode, and a polymer electrolyte membrane therebetween, and at least one of the anode and the cathode may contain the catalyst of the present disclosure.

Hereinafter, the present disclosure will be described in detail through Examples and Experimental Examples.

However, examples and experimental examples to be described later are only to specifically illustrate the present disclosure in one aspect, but the present disclosure is not limited thereto.

<EXAMPLES> PREPARATION OF HYDROPHILIC, POROUS CARBON SUPPORTS

The method of manufacturing the hydrophilic, porous carbon support is the same as described in S100 to S400, and zinc nitrate hydrate was used as the first metal precursor. Hydrophilic, porous carbon supports were prepared by varying the contents of carbon and zinc nitrate hydrate, and the content conditions of the prepared carbon supports are shown in Table 1 below.

TABLE 1

| | Carbon (g) | $Zn_3(PO_4)_2$ (g) |
|---|---|---|
| Example 1 | 10 | 1(0.1 wt %) |
| Example 2 | 10 | 5(0.5 wt %) |
| Example 3 | 10 | 10(1 wt %) |

Figure 3:
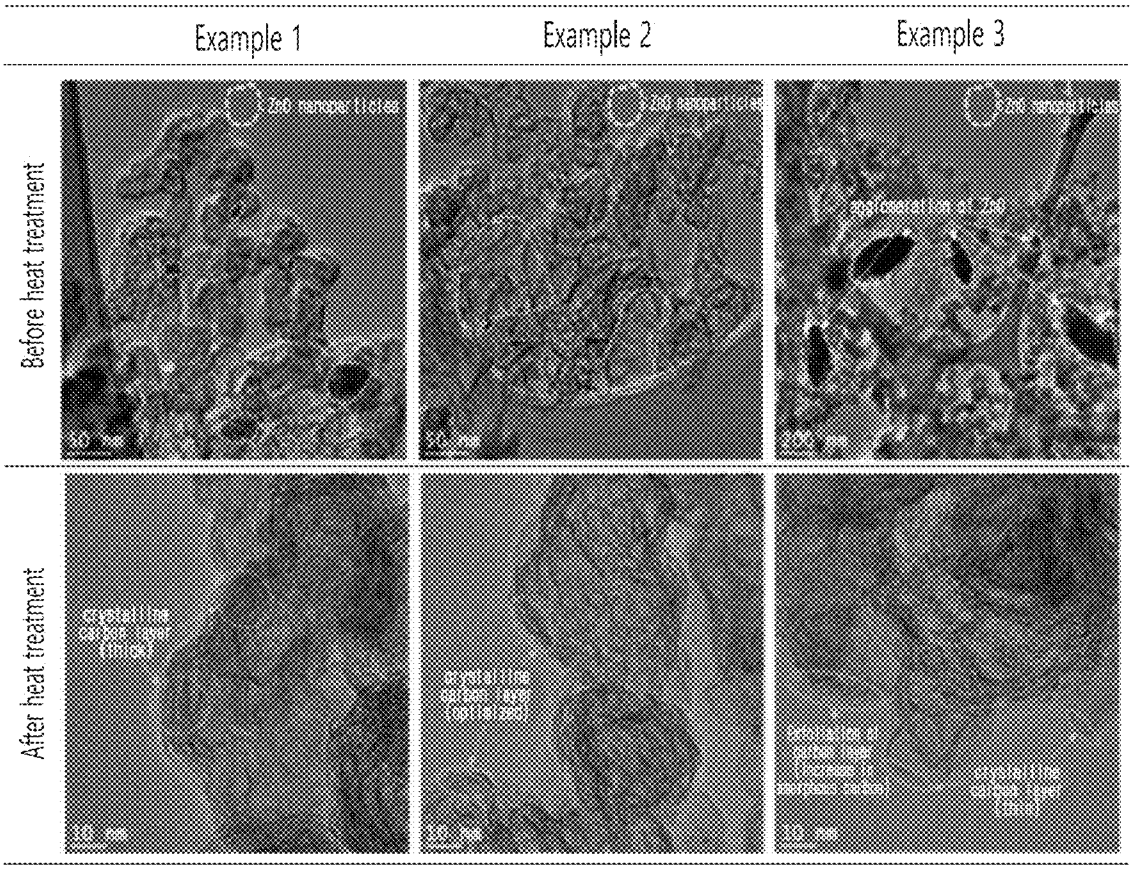
FIG. 3 illustrates a transmission electron microscope (TEM) image of a carbon support according to an embodiment of the present disclosure.

Transmission electron microscope (TEM) images were analyzed before and after the heat treatment (S400) of this example, and results are shown in FIG. 3. Referring to FIG. 3, in the case of the carbon support according to Example, the overall structure was confirmed such that, through the electron beam reduction treatment of the zinc nitrate precursor, mesopores were formed by the vaporization reaction of the zinc metal oxide nanoparticles supported, and the degree of cohesion between the particles was lowered.

<Experimental Example 1> X-Ray Diffraction (XRD) Pattern Analysis and Raman Spectrum Analysis XRD pattern analysis and Raman spectrum analysis were performed on an embodiment according to present disclosure. The experimental method is as follows.

XRD pattern analysis of carbon support was performed at 40 kV and 20 mA by using a Rigaku 1200, a Cu-Kα light source, and a Ni β-filter. The average grain size of carbon was determined using the Debye-Scherer equation from the 26 reflection peak for the graphite (002) lattice plane.

Meanwhile, Raman spectral analysis was performed on the fabricated carbon support by using a Bruker Fourier-transform spectroform spectrophotometer IFS-66/FRA106S, and a 46 mW argon-ion laser (1064 nm) was used as a light source.

Figure 4:
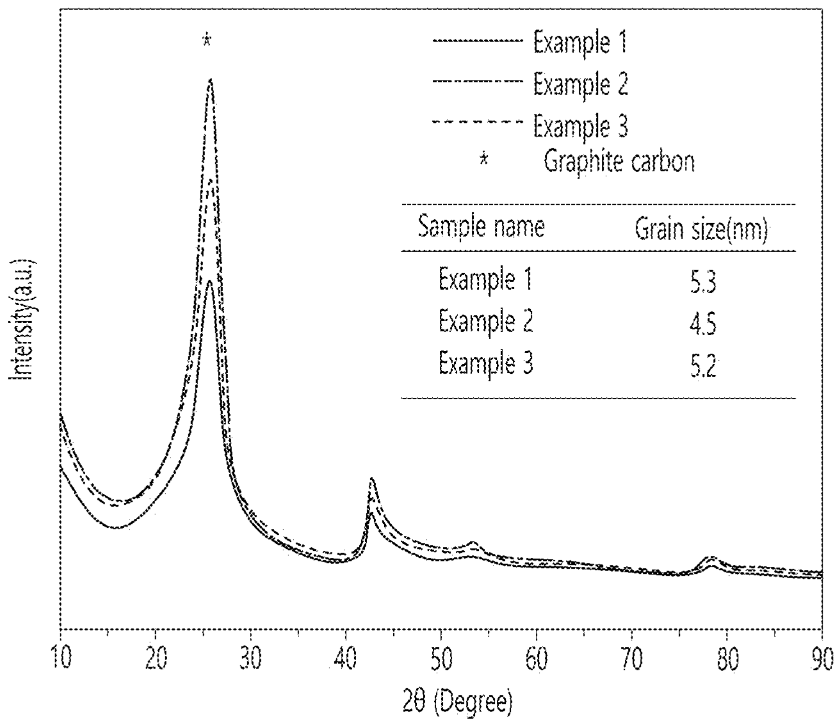
FIG. 4 illustrates an X-ray diffraction (XRD) result of a carbon support according to an embodiment of present disclosure.
Figure 5:
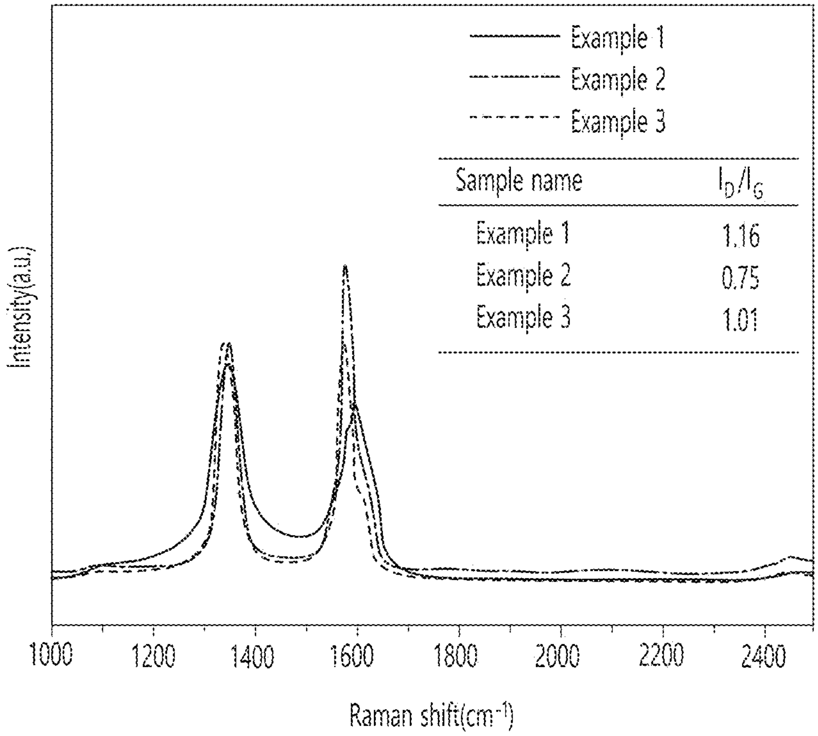
FIG. 5 illustrates a Raman spectrum result of a carbon support according to an embodiment of present disclosure.

Experimental results are shown in FIGS. 4 and 5, respectively. Referring to FIG. 4, it can be seen that the optimized carbon support (Example 2) synthesized according to the present disclosure has higher crystallinity than the support synthesized under other conditions.

Referring to FIG. 5, surface property analysis through comparison of D-Band (amorphousness, Defective band) and G-Band (crystallineness, Graphitic band) show that the optimized carbon support (Example 2) synthesized according to the present disclosure retains similar graphitic band to the result of XRD pattern analysis.

<Experimental Example 2> Brunauer-Emmett-Teller (BET) Specific Surface Area Analysis and Pore Size Distribution Analysis BET specific surface area analysis and pore size distribution analysis were performed on the examples according to the present disclosure, and specifically, the nitrogen gas adsorption amount under liquid nitrogen temperature (77K) was calculated using ASAP2020 of the Micrometrics company.

Figure 6:
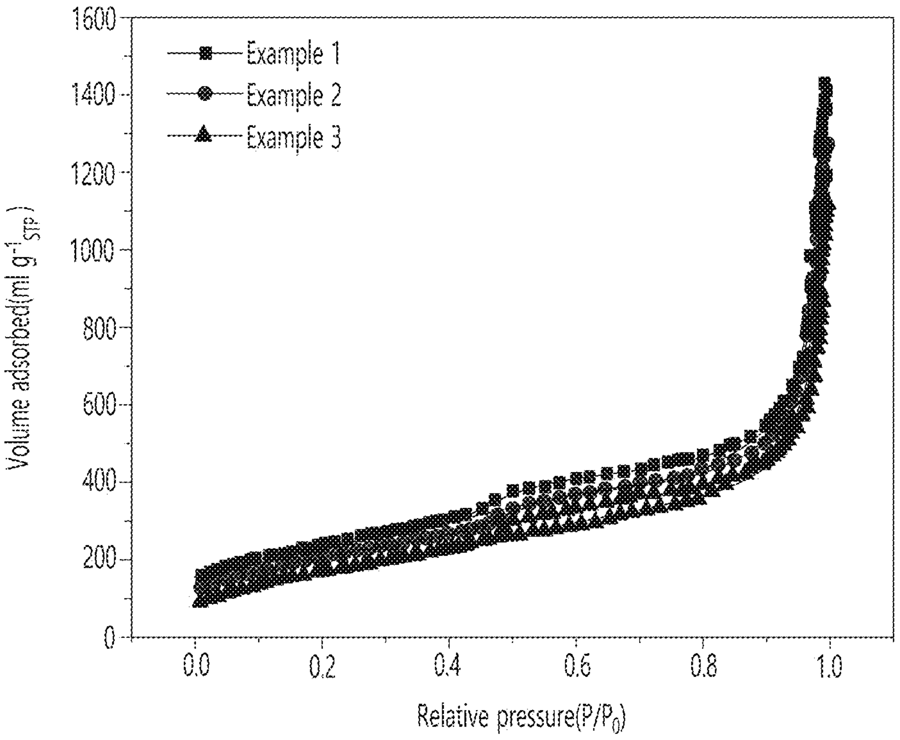
FIG. 6 illustrates a Brunauer-Emmett-Teller (BET) specific surface area analysis of a carbon support according to an embodiment of present disclosure.
Figure 7:
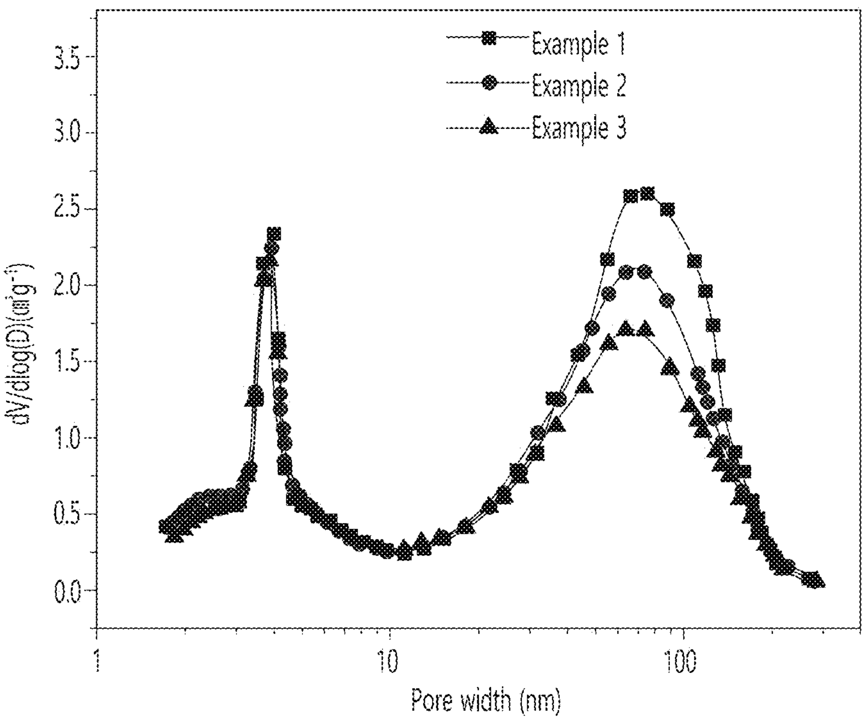
FIG. 7 illustrates the result of the pore size distribution of the carbon support according to an embodiment of the present disclosure.

The experimental results are shown in FIG. 6 and Table 2, and FIG. 7, respectively. Referring to FIG. 6 and Table 2, it can be seen that the total porosity volume is optimized in the carbon support according to an example of the present disclosure.

TABLE 2

| | BET surface area ($m^2/g$) | Micropore area ($m^2/g$) | Pore volume: Micropore volume ($cm^3/g$) | Pore volume: Mesopore volume ($cm^3/g$) | Pore volume: Total pore volume ($cm^3/g$) | Pore size distribution (nm) |
|---|---|---|---|---|---|---|
| Example 1 | 852.3 | 92.10 | 0.03 | 2.13 | 2.16 | 11.75 |
| Example 2 | 749.5 | 51.77 | 0.01 | 1.96 | 1.97 | 10.74 |
| Example 3 | 652.0 | 75.74 | 0.01 | 1.71 | 1.72 | 10.24 |

Referring to Table 2, it can be seen that the area of the micropores was decreased in the case of synthesis ratios of Example 1 and Example 2. However, in the case of the synthesis ratio of Example 3, the area of the micropores tends to increase again. The results show that from the synthesis ratio of Example 3, the micropores could not be controlled in the low-temperature heat treatment step and thus the area thereof was increased.

In addition, referring to FIG. 7, it was confirmed that, in the case of the carbon support according to an embodiment of the present disclosure, the mesoporosity of 2 nm to 50 nm was increased compared to the microporosity of not more than 2 nm.

Figure 8:
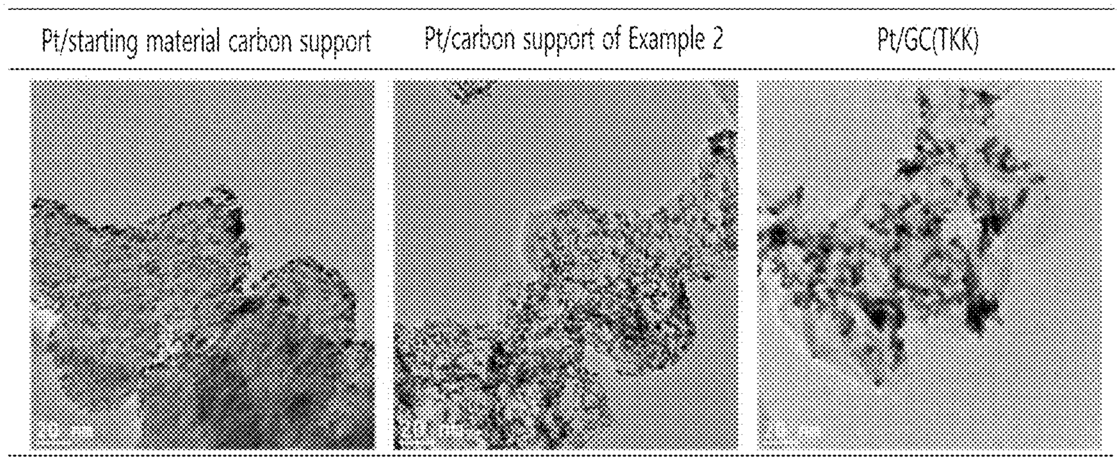
FIG. 8 illustrates a TEM image of a fuel cell catalyst according to an embodiment of the present disclosure.

<Experimental Example 3> Preparation of Fuel Cell Catalyst and X-Ray Diffraction Pattern Analysis (XRD), Raman Spectrum Analysis A fuel cell catalyst was prepared by supporting platinum on the porous carbon support according to the examples. In the manufacturing method, as described in S500 to S700, the amount of the supported platinum was about 50 wt %. FIG. 8 shows transmission electron microscope (TEM) images of a catalyst using platinum nanoparticles supported on a starting material carbon support used in the present disclosure (Comparative Example 1), a catalyst using platinum nanoparticles supported on a carbon support prepared according to an example of the present disclosure (Example 2), and a commercially available platinum catalyst (Pt/GC (TKK); Comparative Example 2). In addition, it was confirmed that platinum was evenly distributed on the carbon support, as presented by the present disclosure.

The catalyst was analyzed by X-ray diffraction pattern analysis and Raman spectrum analysis, and the experimental method was the same as in Experimental Example 1.

Figure 9:
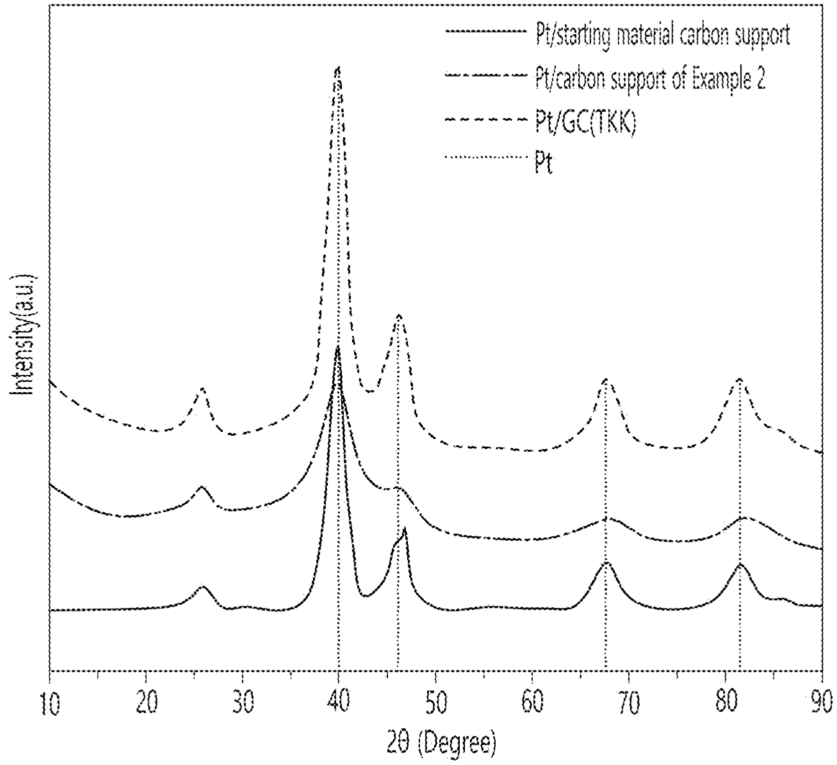
FIG. 9 illustrates a XRD result of a fuel cell catalyst according to an embodiment of the present disclosure.
Figure 10:
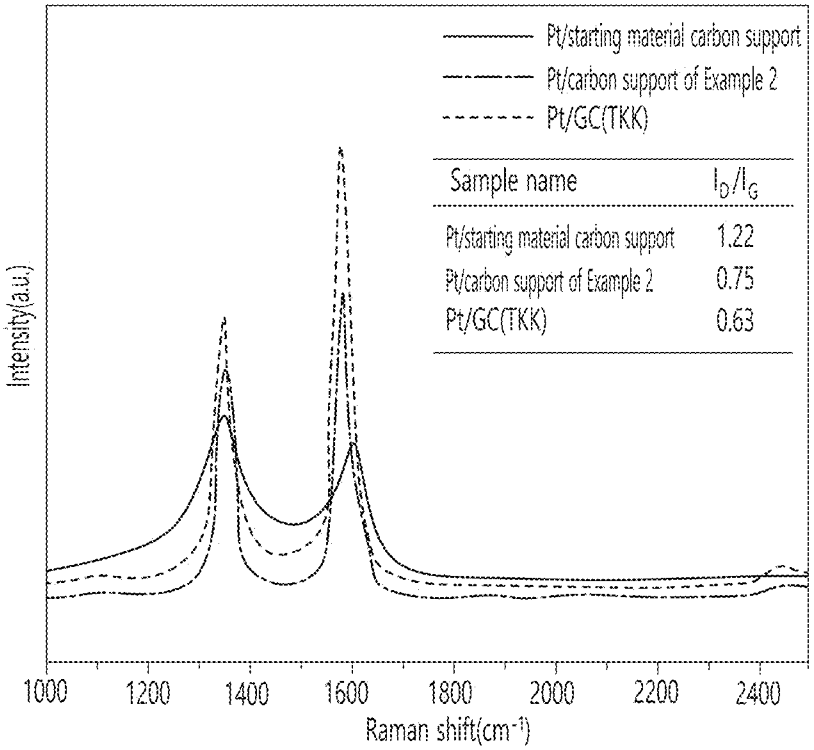
FIG. 10 illustrates a Raman spectrum result of a fuel cell catalyst according to an embodiment of present disclosure.

Experimental results are shown in FIGS. 9 and 10. Referring to FIGS. 9 and 10, it can be seen that the crystallinity of the catalyst according to the optimized carbon support (Example 2) presented according to the present disclosure is similar to the crystallinity of commercial catalysts. In addition, it can be confirmed that platinum is supported in a smaller size than commercial catalysts.

<Experimental Example 4> Analysis of Contact Angle of Fuel Cell Catalyst

For the fuel cell catalyst prepared according to Experimental Example 3, the contact angle was analyzed to verify the ease of fabrication of an electrode when applied to a fuel cell. The experimental method is as follows.

A catalyst slurry was prepared by mixing 0.4 g of Nafion ionomer and isopropanol on the surface of carbon fiber paper used as a gas diffusion layer (GDL), and then applied on the gas flow layer membrane to manufacture an electrode assembly including a catalyst layer. Water was dropped on the surface of the applied electrode assembly in equipment for measuring the contact angle of water, and an image of the contact angle formed in this regard was obtained. In the case of hydrophobicity, the contact angle shows a relatively large value, and in the case of hydrophilicity, the contact angle shows a relatively low value.

Figure 11:
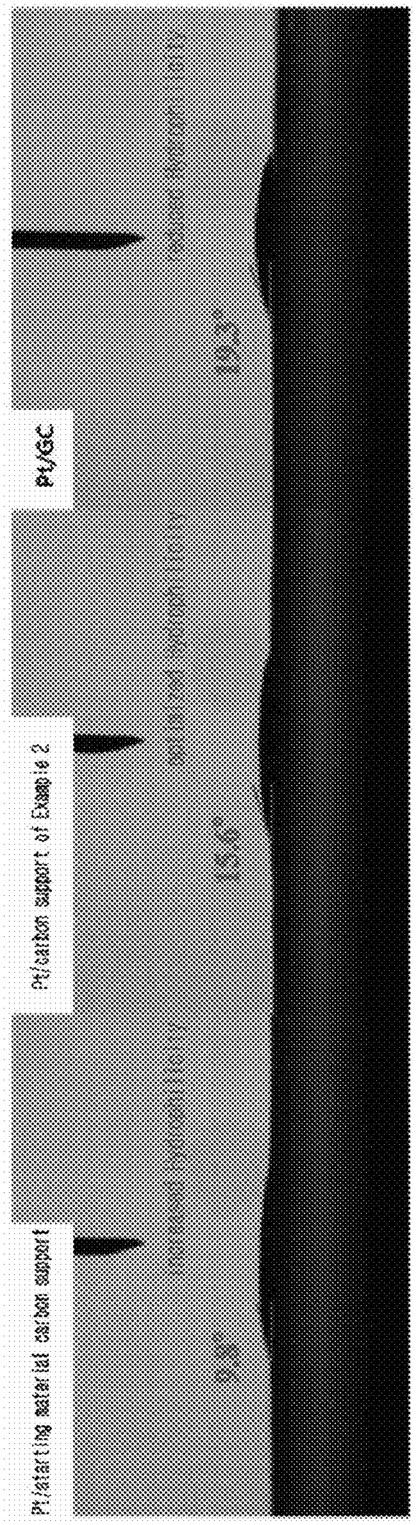
FIG. 11 illustrates measurements of a contact angle of a fuel cell catalyst according to an embodiment of present disclosure.

Experimental results are shown in FIG. 11. Referring to FIG. 11, it can be seen that the catalyst according to Example 2 has lower hydrophilicity than Comparative Example 1, while having higher hydrophilicity than Comparative Example 2, which is an existing commercial catalyst. These results show that the hydrophilic/hydrophobic properties of the carbon support presented according to the present disclosure are optimized.

The cause of the increase in hydrophilicity was confirmed to be due to the exposure of the amorphous carbon layer exposed in the exfoliation process of the crystalline carbon layer at the synthesis ratio of Example 2. In the case of the synthesis ratio of Example 3, it was confirmed that the hydrophobicity was increased due to the additional exposure of exfoliated crystalline carbon layers, reaching the threshold of exposed amorphous carbon layers. As a tendency of the examples, it is confirmed that the hydrophilicity was decreased from the synthetic ratio of Example 2.

<Experimental Example 5> Performance Evaluation of Fuel Cell Catalyst

The performance of the catalyst was evaluated for the fuel cell catalyst prepared according to Experimental Example 3, and the experimental method is as follows.

1 g of the prepared platinum catalyst was mixed with 0.4 g of Nafion ionomer and isopropanol to prepare a catalyst slurry, and then the catalyst slurry was coated on a polymer electrolyte membrane to prepare a membrane electrode assembly including a catalyst layer. The membrane electrode assembly prepared as described above was inserted into between two gaskets, and then, inserted into a separator having a gas flow channel, followed by compressing, thereby forming a unit cell. The manufactured unit cell was humidified under conditions of 60° C. and 100% relative humidity (RH), and polarization performance thereof was measured using a WFCTS fuel cell test system under constant current and voltage.

Figure 12A:
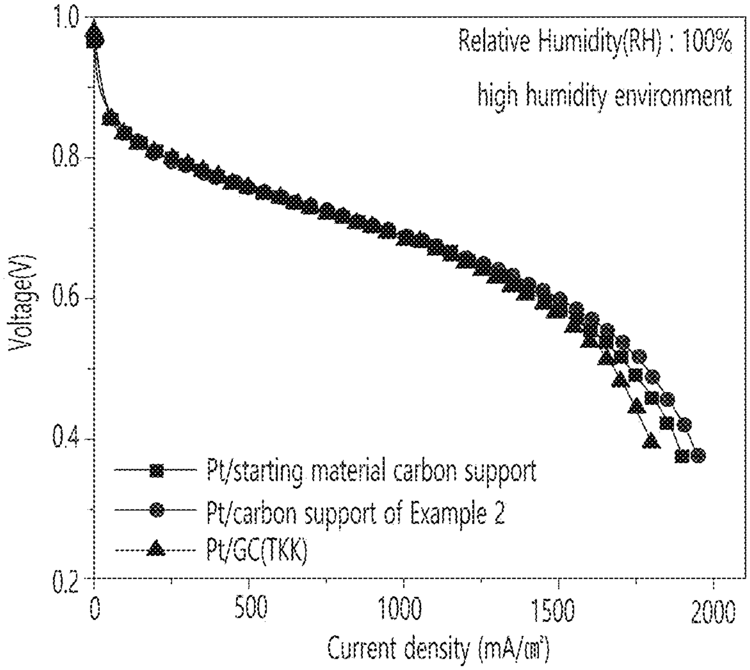
FIGS. 12A and 12B illustrate an analysis result of the performance of a fuel cell catalyst according to an embodiment of the present disclosure.
Figure 12B:
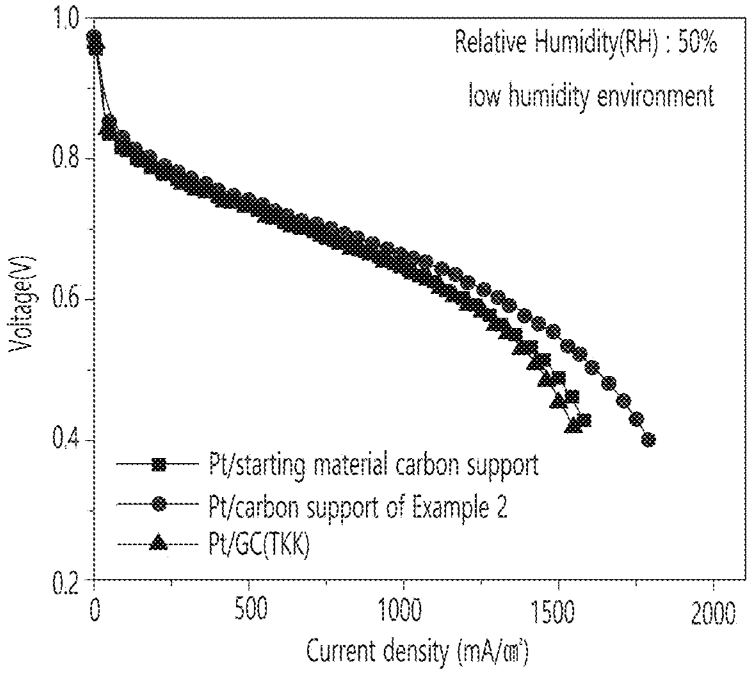

Experimental results are shown in FIGS. 12A, 12B and Table 3.

FIGS. 12A and 12B show a current-voltage curve (IV curve) of the performance of a fuel cell catalyst unit cell, showing results obtained by comparing the performance of a fuel cell catalyst unit cell in a high humidity environment (relative humidity (RH): 100%) and the performance of a fuel cell catalyst unit cell in a low humidity environment (relative humidity: 50%). These results show that the platinum-supported catalyst prepared by applying electron beam irradiation reduction to the synthesized optimal carbon support (Example 2) showed improved unit cell performance even in high-current environments compared to commercial catalysts (Comparative Example 2) or catalysts using carbon support of starting materials (Comparative Example 1). The performance evaluation results are summarized in Table 3.

TABLE 3

| | V@ 250 mA/cm² | | V@ 500 mA/cm² | | V@ 800 mA/cm² | | V@ 1000 mA/cm² | |
|---|---|---|---|---|---|---|---|---|
| | RH 100% | RH 50% | RH 100% | RH 50% | RH 100% | RH 50% | RH 100% | RH 50% |
| Comparative Example 1 | 0.797 | 0.768 | 0.757 | 0.721 | 0.715 | 0.678 | 0.687 | 0.639 |
| Example 2 catalyst | 0.798 | 0.784 | 0.757 | 0.739 | 0.715 | 0.692 | 0.689 | 0.664 |
| Comparative Example 2 | 0.799 | 0.775 | 0.756 | 0.730 | 0.714 | 0.680 | 0.685 | 0.640 |

A method of manufacturing a fuel cell catalyst according to the present disclosure provides a new carbon support composition having the following features: supporting of metal compounds by electron beam reduction of metal precursors, improvement of mesoporosity and dispersion of crystalline carbon obtained by metal vaporization by sequential low-temperature heat treatment, and improved performance stability in a low-humidity atmosphere.

Although the present disclosure has been described with reference to specific embodiments shown in the drawings, it should be understood that these are presented herein for illustrative purpose only and that those skilled in the art would recognize various modifications thereon and variations modification on embodiments. Therefore, the true technical scope of protection of the present disclosure should be determined by the technical spirit of the appended claims.

The invention claimed is:

1. A method of producing a fuel cell catalyst comprising:
heat treating a carbon support;
forming a first precursor mixed solution by mixing the carbon support and a first metal precursor solution;
supporting a first metal by irradiating the first precursor mixed solution with an electron beam;
heat-treating the carbon support supporting the first metal;
forming a second precursor mixed solution by mixing the carbon support supporting the first metal and a second metal precursor solution;
alloying a second metal by irradiating the second precursor mixed solution with an electron beam; and
obtaining a carbon support in which the second metal is alloyed,
wherein in the heat-treating of the carbon support supporting the first metal, the heat treatment temperature is 1000° C. to 1600° C.

2. The method of claim 1, wherein in the heat-treating of the carbon support, a heat treatment temperature is 400° C. to 700° C., and a heat treatment time is 1 hour to 3 hours.

3. The method of claim 1, wherein the purity of the carbon support is improved by the heat-treating of the carbon support.

4. The method of claim 1, wherein the first metal precursor is a precursor of zinc (Zn), magnesium (Mg), or calcium (Ca).

5. The method of claim 1, wherein the first metal precursor is zinc nitrate hydrate ($Zn(NO_3)_2 \cdot 6H_2O$), zinc phosphate hydrate ($Zn_3(PO_4)_2 \cdot 4H_2O$), or zinc sulfate hydrate ($ZnSO_4 \cdot 7H_2O$).

6. The method of claim 1, wherein in the forming of the first precursor mixed solution, a pH of the first precursor mixed solution is adjusted to be basic.

7. The method of claim 1, wherein in the supporting of the first metal, an irradiation time of the electron beam is not more than 20 minutes.

8. The method of claim 1, wherein the supporting of the first metal comprises drying after filtering the first precursor mixed solution irradiated with the electron beam.

9. The method of claim 1, wherein the carbon support and the first metal precursor are mixed at a weight ratio of 1:0.1 to 1:1.

10. The method of claim 1, wherein in the heat-treating of the carbon support supporting the first metal, the heat treatment time is 1 hour to 5 hours.

11. The method of claim 1, wherein the second metal precursor is a platinum (Pt) precursor.

12. The method of claim 1, wherein in the forming of the second precursor mixed solution, the pH of the second precursor mixed solution is adjusted to be basic.

13. The method of claim 1, wherein in the alloying of the second metal by irradiating the second precursor mixed solution with an electron beam, an irradiation time of the electron beam is in the range of 15 minutes to 30 minutes.

14. The method of claim 1, wherein in the obtaining of a carbon support in which the second metal is alloyed, the second precursor mixed solution that has been irradiated with an electron beam, is filtered and then dried.

15. The method of claim 1, wherein the fuel cell catalyst has mesopores having a size of 2 nm to 50 nm.

16. The method of claim 1, wherein the fuel cell catalyst has a water contact angle of 10° to 19°.

* * * * *